US007922496B2

(12) United States Patent
Liu et al.

(10) Patent No.: US 7,922,496 B2
(45) Date of Patent: Apr. 12, 2011

(54) MOTHERBOARD

(75) Inventors: Lei Liu, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/632,804

(22) Filed: Dec. 8, 2009

(65) Prior Publication Data

US 2011/0053387 A1    Mar. 3, 2011

(30) Foreign Application Priority Data

Aug. 31, 2009  (CN) .......................... 2009 1 0306396

(51) Int. Cl.
*H01R 12/00* (2006.01)
(52) U.S. Cl. .......................................... 439/65; 439/79

(58) Field of Classification Search ................ 439/65, 439/79, 62
See application file for complete search history.

(56) References Cited

U.S. PATENT DOCUMENTS

| | | | | | |
|---|---|---|---|---|---|
| 5,454,725 | A | * | 10/1995 | Speiser et al. | 439/61 |
| 5,576,935 | A | * | 11/1996 | Freer et al. | 361/785 |
| 5,987,531 | A | * | 11/1999 | Ikeda et al. | 710/8 |
| 6,341,988 | B1 | * | 1/2002 | Zhu et al. | 439/630 |
| 6,659,803 | B1 | * | 12/2003 | Chen | 439/638 |
| 7,354,275 | B2 | * | 4/2008 | Chuang et al. | 439/65 |
| 7,566,227 | B2 | * | 7/2009 | Li | 439/65 |
| 2002/0081873 | A1 | * | 6/2002 | Harris et al. | 439/79 |
| 2005/0079743 | A1 | * | 4/2005 | Hou et al. | 439/65 |
| 2006/0003606 | A1 | * | 1/2006 | Wei-Chieh et al. | 439/65 |

* cited by examiner

*Primary Examiner* — Gary F. Paumen
(74) *Attorney, Agent, or Firm* — Zhigang Ma

(57) ABSTRACT

A motherboard includes a motherboard substrate and an external interface module including a plurality of external interfaces. The external interface module is detachably and electrically connected to the motherboard substrate.

4 Claims, 3 Drawing Sheets

MOTHERBOARD

BACKGROUND

1. Technical Field

The present disclosure relates to a motherboard.

2. Description of Related Art

Computer external interfaces connected to computer peripherals generally include universal serial bus (USB) interfaces, personal system 2 (PS/2) ports, digital visual interfaces (DVI), video graphic array (VGA) ports, communication (COM) ports, local area network (LAN) ports, and so on. Computer motherboard manufacturers set these external interfaces on a motherboard as needed and their being exposed at the rear of a computer means that the motherboard has to be replaced if any of the interfaces breaks down.

DETAILED DESCRIPTION

Figure 1:
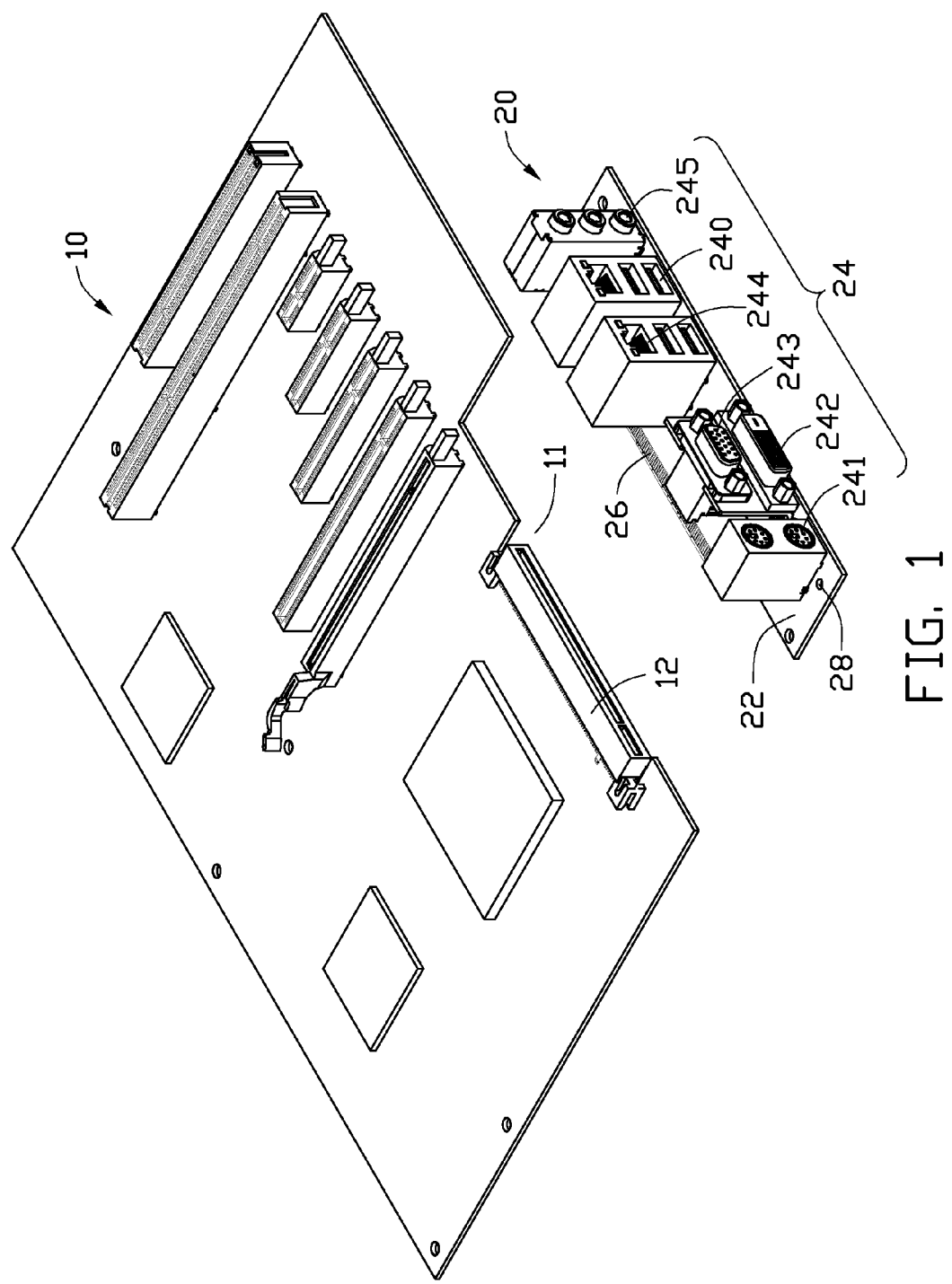
FIG. 1 is an exploded, isometric view of a first exemplary embodiment of a motherboard.
Figure 2:
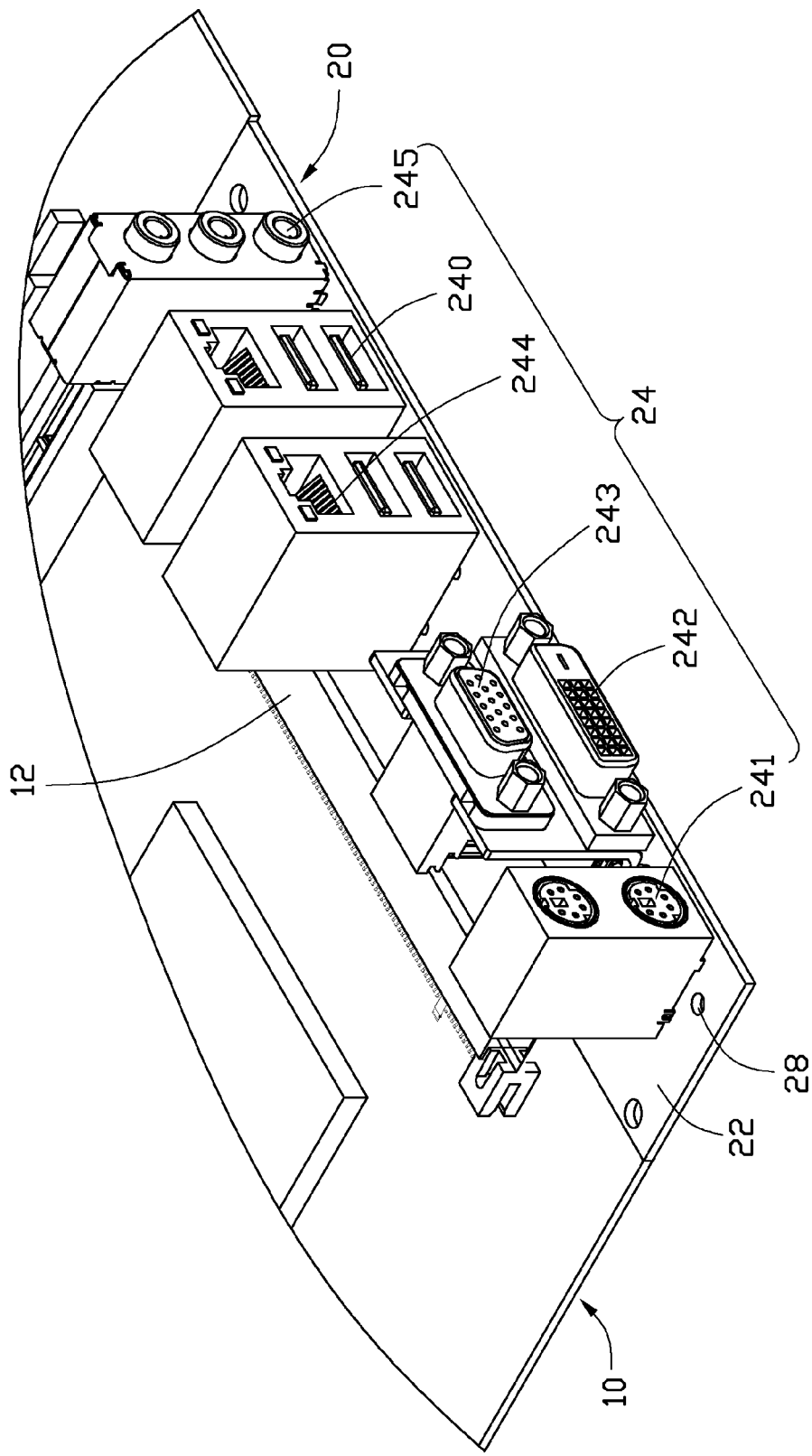
FIG. 2 is a partial, isometric and assembled view of the motherboard of FIG. 1.

Referring to FIGS. 1 and 2, a first exemplary embodiment of a motherboard includes a motherboard substrate 10 and an external interface module 20. The external interface module 20 can be electrically connected to the motherboard substrate 10.

The motherboard substrate 10 is similar to common motherboards except no external interfaces are included. The included items are such things as central processing unit (CPU) sockets, CPUs mounted to the CPU sockets, northbridge and southbridge chips, peripheral component interconnect express (PCI-E) sockets, input or output (I/O) chips, and so on. A rear side of the motherboard substrate 10 defines an elongated cutout 11. A PCI-E connector 12 is mounted to the motherboard substrate 10, facing the cutout 11. The PCI-E connector 12 may be mounted to another location of the motherboard substrate 10, satisfying different needs.

The external interface module 20 includes a circuit board 22 and a plurality of external interfaces 24 assembled on the circuit board 22. The plurality of external interfaces 24 may include a universal serial bus (USB) interface 240, a personal system 2 (PS/2) interface 241, a digital visual interface (DVI) 242, a video graphic array (VGA) interface 243, a local area network (LAN) port 244, and an audio interface 245, arranged in suitable orders as needed. A plurality of golden fingers 26 is formed on a side of the circuit board 22. The plurality of golden fingers 26 is electrically connected to the plurality of external interfaces 24. The circuit board 22 further respectively defines a plurality of fixing holes 28 in corners of the circuit board 22. A plurality of screws (not shown) is extended through the plurality of fixing holes 28 to engage with a computer chassis (not shown), to fix the external interface module 20 to the chassis.

In assembly, the plurality of golden fingers 26 of the external interface module 20 is engaged in the PCI-E connector 12 of the motherboard substrate 10, therefore, the external interface module 20 is electrically connected to the motherboard substrate 10.

Figure 3:
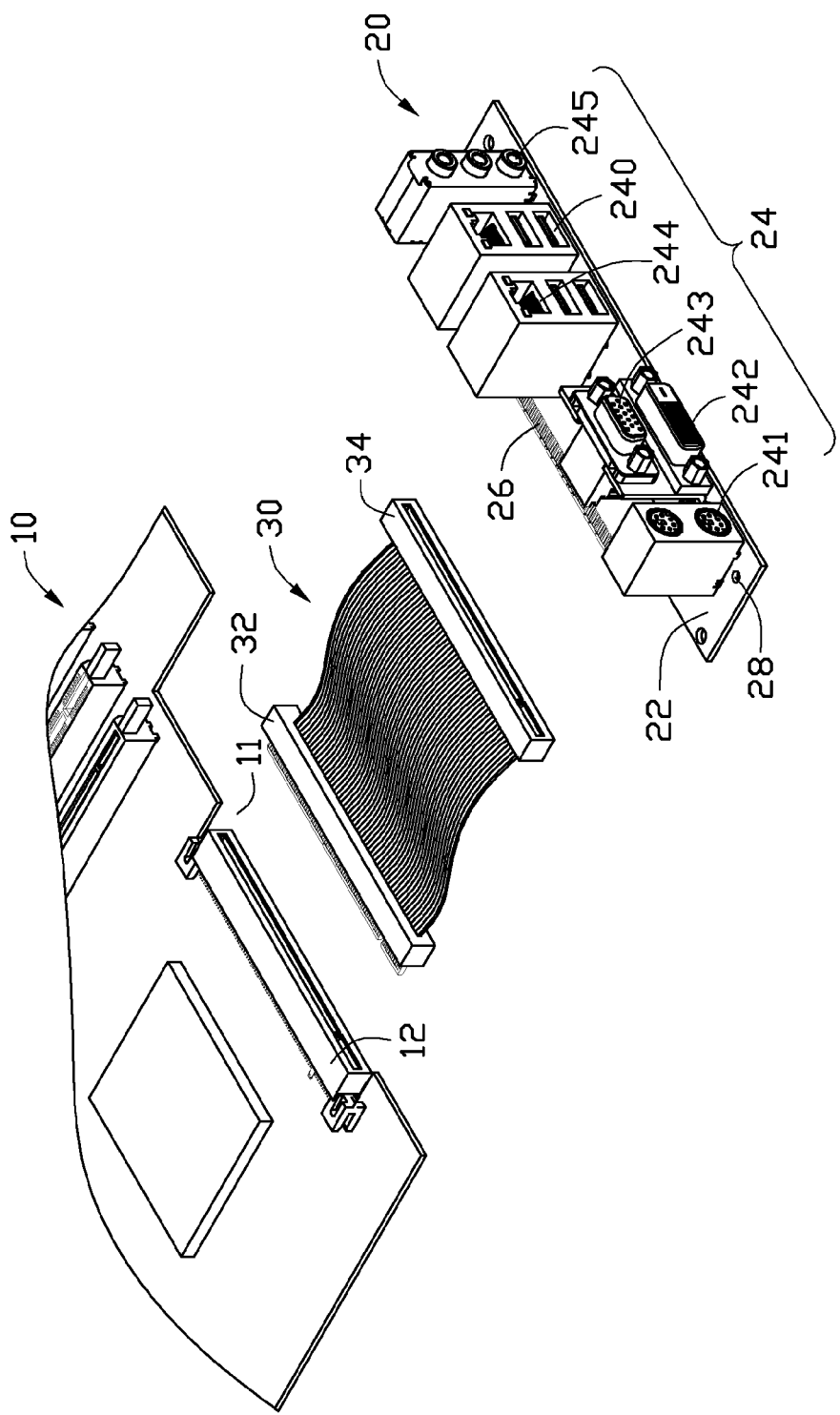
FIG. 3 is an exploded, isometric view of a second exemplary embodiment of a motherboard.

Referring to FIG. 3, a second exemplary embodiment of a motherboard includes a motherboard substrate 10, an external interface module 20, and a data line 30. The data line 30 includes a first connector 32 and a second connector 34. The first connector 32 is electrically connected to the PCI-E connector 12 of the motherboard substrate 10, and the second connector 34 is electrically connected to the plurality of golden fingers 26 of the external interface module 20. The external interface module 20 communicates with the motherboard substrate 10 via the data line 30.

In use, if any of the plurality of external interfaces 24 of the present disclosure stop working properly, the external interface module 20 can be easily replaced.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A motherboard comprising:
   a motherboard substrate comprising a first connector;
   an external interface module comprising a circuit board, a plurality of external interfaces arranged on the circuit board and a plurality of golden fingers formed on the circuit board electrically connected to the external interfaces; and
   a data line comprising a pair of second connectors formed at two ends thereof,
   wherein the external interface module is to be electrically connected with the motherboard substrate either by the golden fingers of the external interface modules being directly connected with the first connector of the motherboard substrate or by the second connectors of the data line respectively being connected with the first connector and the golden fingers.

2. The motherboard of claim 1, wherein the motherboard substrate defines an elongated cutout in a side of the motherboard substrate, the first connector is formed on a side bounding the cutout.

3. The motherboard of claim 1, wherein the first connector is a peripheral component interconnect express connector.

4. The motherboard of claim 1, wherein the plurality of external interfaces comprises a universal serial bus interface, a personal system 2 interface, a digital visual interface, a video graphic array interface, a local area network port, and an audio interface.

* * * * *